United States Patent
Jiang et al.

(10) Patent No.: US 10,582,338 B2
(45) Date of Patent: Mar. 3, 2020

(54) POSITIONING METHOD AND DEVICE

(71) Applicants: BEIJING XIAOMI MOBILE SOFTWARE CO., LTD., Beijing (CN); BEIJING SMARTMI TECHNOLOGY CO., LTD., Beijing (CN)

(72) Inventors: Nan Jiang, Beijing (CN); Yi Wang, Beijing (CN)

(73) Assignees: BEIJING XIAOMI MOBILE SOFTWARE CO., LTD., Beijing (CN); BEIJING SMARTMI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/182,549

(22) Filed: Nov. 6, 2018

(65) Prior Publication Data

US 2019/0141479 A1    May 9, 2019

(30) Foreign Application Priority Data

Nov. 7, 2017    (CN) .......................... 2017 1 1083898

(51) Int. Cl.
*H04W 4/02*    (2018.01)
*H04W 4/024*    (2018.01)
(Continued)

(52) U.S. Cl.
CPC .............. *H04W 4/024* (2018.02); *G01S 5/14* (2013.01); *G01S 19/51* (2013.01); *H04W 4/023* (2013.01); *H04W 4/80* (2018.02)

(58) Field of Classification Search
CPC ......... H04W 4/02; H04W 4/024; H04W 4/80; H04W 4/023; G01S 5/14
See application file for complete search history.

(56) References Cited

U.S. PATENT DOCUMENTS

2016/0005004 A1* 1/2016 Trabue ............... G06Q 10/1095
705/7.19
2016/0260053 A1    9/2016 Barron et al.
(Continued)

FOREIGN PATENT DOCUMENTS

CN    103164518 A    6/2013
CN    103913174 A    7/2014
(Continued)

OTHER PUBLICATIONS

Supplementary European Search Report in the European application No. 18204645.8, dated Apr. 8, 2019.
(Continued)

*Primary Examiner* — Said M Elnoubi
(74) *Attorney, Agent, or Firm* — Syncoda LLC; Feng Ma

(57) ABSTRACT

A positioning method includes: acquiring first positioning data of terminal equipment and second positioning data of a region where a shared resource is located; judging whether a distance between the terminal equipment and the region where the shared resource is located is in a specific range or not according to the first positioning data and the second positioning data; upon the distance between the terminal equipment and the region where the shared resource is located being in the specific range, determining a position of the shared resource based on Bluetooth data corresponding to the shared resource; and controlling the terminal equipment to present position information of the shared resource.

17 Claims, 9 Drawing Sheets

(51) Int. Cl.
*H04W 4/80* (2018.01)
*G01S 5/14* (2006.01)
*G01S 19/51* (2010.01)

(56) References Cited

U.S. PATENT DOCUMENTS

2018/0342105 A1    11/2018  Jiang
2018/0342157 A1*  11/2018  Donnelly ........... G01C 21/3492

FOREIGN PATENT DOCUMENTS

| | | | |
|---|---|---|---|
| CN | 103942049 A | | 7/2014 |
| CN | 104769393 A | | 7/2015 |
| CN | 104869132 A | | 8/2015 |
| CN | 105025437 A | | 11/2015 |
| CN | 105554878 A | * | 5/2016 |
| CN | 106412808 A | | 2/2017 |
| CN | 106998364 A | | 8/2017 |
| CN | 107229706 A | | 10/2017 |
| EP | 2933780 A1 | | 10/2015 |
| GB | 2511097 A | | 8/2014 |

OTHER PUBLICATIONS

First Office Action of the Chinese application No. 201711083898.3, dated Dec. 20, 2019.

* cited by examiner

POSITIONING METHOD AND DEVICE

CROSS-REFERENCE TO RELATED APPLICATION

This application claims the priority to Chinese Patent Application No. 201711083898.3, filed on Nov. 7, 2017, the disclosure of which is hereby incorporated by reference in its entirety.

BACKGROUND

Along with the development economy, more and more shared resources are available to users. Such shared resources may include, for example, shared bicycles and shared cars. However, when a user expects to use a shared resource, there often exist the problems of quickly locating the shared resources, resulting from for example inaccurate positioning of the shared resources. In an example, a map positioning error of a shared bicycle may be so large that a user may not be able to rapidly and accurately locate the bicycle according to map positioning.

SUMMARY

According to a first aspect of embodiments of the present disclosure, a positioning method is provided, which may include that:

first Global Positioning System (GPS) positioning data of terminal equipment and second GPS positioning data of a region where a shared resource is located are acquired;

it is judged whether a distance between the terminal equipment and the region where the shared resource is located is in a specific range or not according to the first GPS positioning data and the second GPS positioning data;

when the distance between the terminal equipment and the region where the shared resource is located is in the specific range, a position of the shared resource is determined based on Bluetooth data corresponding to the shared resource; and the terminal equipment is controlled to present position information of the shared resource.

According to a second aspect of the embodiments of the present disclosure, a positioning device is provided, which may include:

a positioning data acquisition portion, configured to acquire first GPS positioning data of terminal equipment and second GPS positioning data of a region where a shared resource is located;

a judgment portion, configured to judge whether a distance between the terminal equipment and the region where the shared resource is located is in a specific range or not according to the first GPS positioning data and the second GPS positioning data;

a first position determination portion, configured to, when the distance between the terminal equipment and the region where the shared resource is located is in the specific range, determine a position of the shared resource based on Bluetooth data corresponding to the shared resource; and a first control portion, configured to control the terminal equipment to present position information of the shared resource.

According to a third aspect of the embodiments of the present disclosure, a positioning device is provided, which may include:

a processor; and a memory configured to store instructions executable by the processor, wherein the processor may be configured to execute the abovementioned method.

According to a fourth aspect of the embodiments of the present disclosure, a non-transitory computer-readable storage medium is provided, having stored therein instructions, when executed by a processor, to enable the processor to execute the abovementioned positioning method.

It should be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Figure 1:
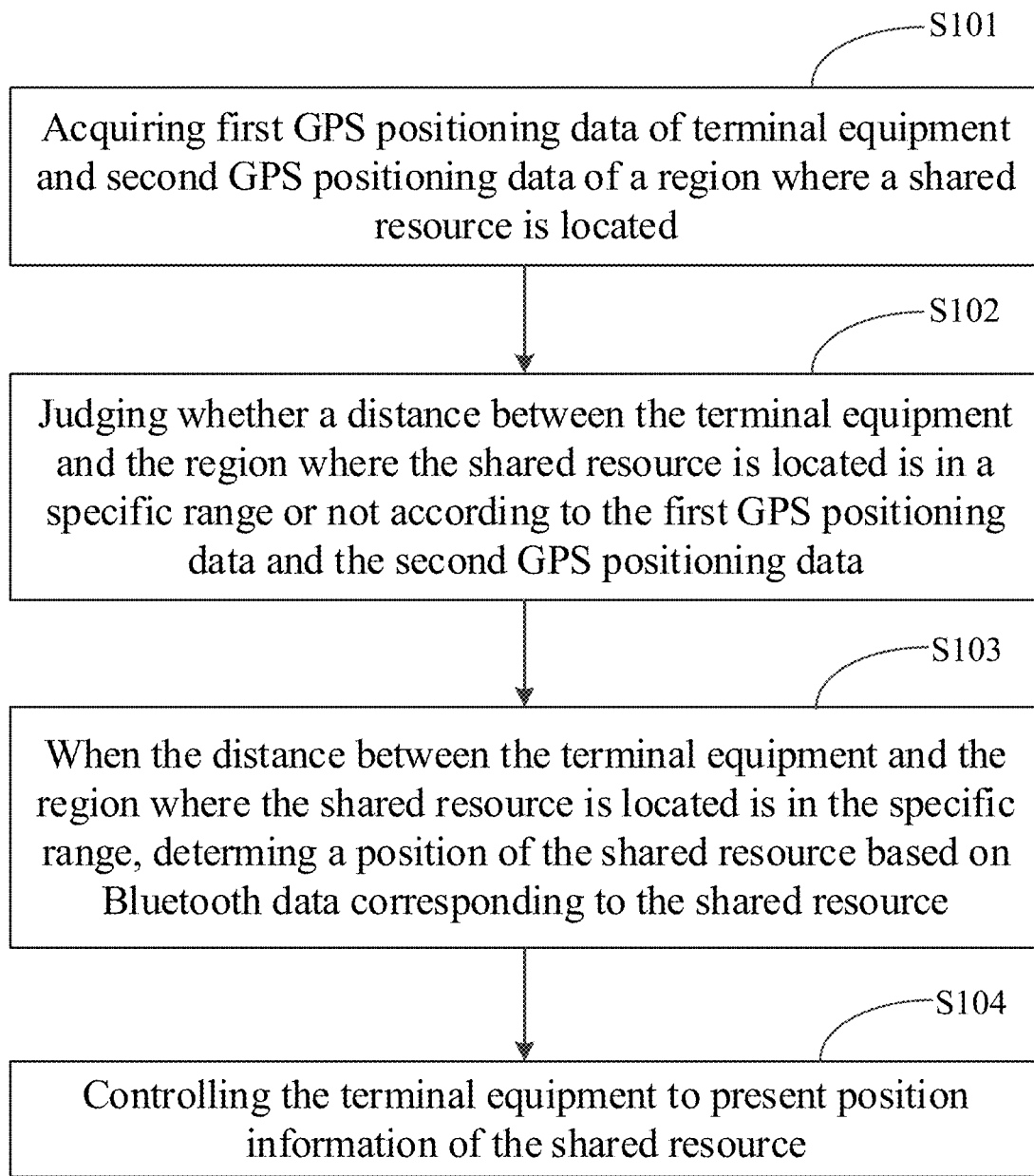
FIG. 1 is a flowchart showing a positioning method according to some embodiments.

FIG. 1 is a flowchart showing a positioning method according to some embodiments. As shown in FIG. 1, the method can be applied to a server. The positioning method according to the embodiment of the present disclosure includes the following steps.

In Step S101, first GPS positioning data of terminal equipment and second GPS positioning data of a region where a shared resource is located can be acquired.

In Step S102, it can be judged whether a distance between the terminal equipment and the region where the shared resource is located is in a specific range or not according to the first GPS positioning data and the second GPS positioning data.

Although in the disclosure "GPS" positioning is employed to describe various embodiments, those of ordinary skill in the art will recognize that various other navigation systems can be employed to allow terminal devices such as mobile phones to accurately determine their locations. For example, satellite-based positioning systems such as the GPS, the GLONASS, The Galileo positioning system, and the BeiDou Navigation Satellite System can be adopted by mobile terminal devices for positioning.

In Step S103, when the distance between the terminal equipment and the region where the shared resource is located is in the specific range, a position of the shared resource can be determined based on Bluetooth data corresponding to the shared resource.

In Step S104, the terminal equipment can be controlled to present position information of the shared resource.

According to some embodiments of the present disclosure, when it is judged through the positioning data of the terminal equipment and the region where the shared resource is located that the distance between the terminal equipment and the region where the shared resource is located is in the specific range, the position of the shared resource can be determined based on the Bluetooth data corresponding to the shared resource, and the terminal equipment can be controlled to present the position information of the shared resource, so that accurate positioning of the shared resource can be implemented, and a user may conveniently and rapidly find the shared resource.

For example, when the user expects to use the shared resource, terminal equipment of the user may be turned on to check information of the position or the like of the shared resource and execute an operation such as reservation for the shared resource. The terminal equipment may include a mobile phone, a tablet computer, augmented reality (AR) or virtual reality (VR) glasses, or the like. The shared resource is a shared resource reserved or selected by the terminal equipment, and for example, the shared resource may be a shared bicycle, a shared electric vehicle, a shared power bank or the like.

For example, when expecting to use a shared bicycle, the user may start certain bicycle sharing software in a mobile phone to check a distribution condition of shared bicycles nearby. The mobile phone of the user is in a GPS function-on state. At this moment, a server may acquire a general distribution condition of the shared bicycles nearby the user according to first GPS positioning data of the mobile phone of the user (for example, the general distribution condition of the shared bicycles nearby the user is determined according to GPS positioning data of the shared bicycles) and control the mobile phone of the user to present the general distribution condition of the shared bicycles.

The user may execute the reservation operation for the shared bicycle on a display page of the mobile phone, and may also directly go to a corresponding region to look for the shared bicycle according to the general distribution condition of the shared bicycles. Those of ordinary skill in the art will recognize that the user may directly reserve or select the shared resource through the mobile phone or the AR glasses and may also reserve or select the shared resource through the mobile phone in combination with the AR glasses (for example, a main function of the AR glasses is similar to a screen of a mobile phone and a camera of a mobile phone at this moment). A type and form of the terminal equipment and a type of the shared resource are not limited in the present disclosure.

In some implementations, the region where the shared resource is located has GPS-based positioning, and the server may acquire the first GPS positioning data of the terminal equipment of the user and control the terminal equipment of the user to present a distribution condition of shared resources in a region where at least one shared resource around the user is located. The region where the shared resources are located may be a set region configured to park and place the shared resources.

For example, a region configured to park shared bicycles (for example, a shared bicycle parking bay) may be set, and a GPS is arranged in the region with the shared bicycles. When expecting to use a shared bicycle, the user starts certain bicycle sharing software in the mobile phone. The mobile phone is in the GPS function-on state, and the server may acquire first GPS positioning data of the mobile phone and control the mobile phone to display available shared bicycles in at least one shared bicycle parking bay around according to the first GPS positioning data. For example, the server may control the mobile phone of the user to present general positions of shared bicycles in multiple shared bicycle parking bays in a map.

In some implementations, the server may acquire the first GPS positioning data of the terminal equipment and the second GPS positioning data of the region where the shared resource is located.

For example, when the user reserves a shared bicycle in a certain shared bicycle parking bay or the user goes to a corresponding region to look for a shared bicycle according to a position of a shared bicycle parking bay on the map of the mobile phone, the server may acquire the first GPS positioning data of the mobile phone of the user and second GPS positioning data of the shared bicycle parking bay.

In some implementations, the server may judge whether the distance between the terminal equipment and the region where the shared resource is located is in the specific range or not according to the first GPS positioning data and the second GPS positioning data.

For example, when the user goes to look for a shared bicycle according to a general position of the shared bicycle on the map of the mobile phone after reserving the shared bicycle in a certain shared bicycle parking bay, the server may judge whether a distance between the mobile phone of the user and the shared bicycle parking bay is in a specific range or not according to the first GPS positioning data of the mobile phone of the user and second GPS positioning data of the shared bicycle parking bay where the shared bicycle is located.

In such a manner, the server may judge whether the user is located nearby the shared resource expected to be used or not. Those of ordinary skill in the art will recognize that the related technology may be adopted to acquire the first GPS positioning data of the terminal equipment and the second GPS positioning data of the region where the shared resource is located and judge whether the distance between the terminal equipment and the region where the shared resource is located is in the specific range or not according to the first GPS positioning data and the second GPS positioning data. An acquisition manner for the first GPS positioning data and the second GPS positioning data, a judgment manner for judging whether the distance between the terminal equipment and the region where the shared resource is located is in the specific range or not and a value of the specific range are not limited in the present disclosure.

Figure 2:
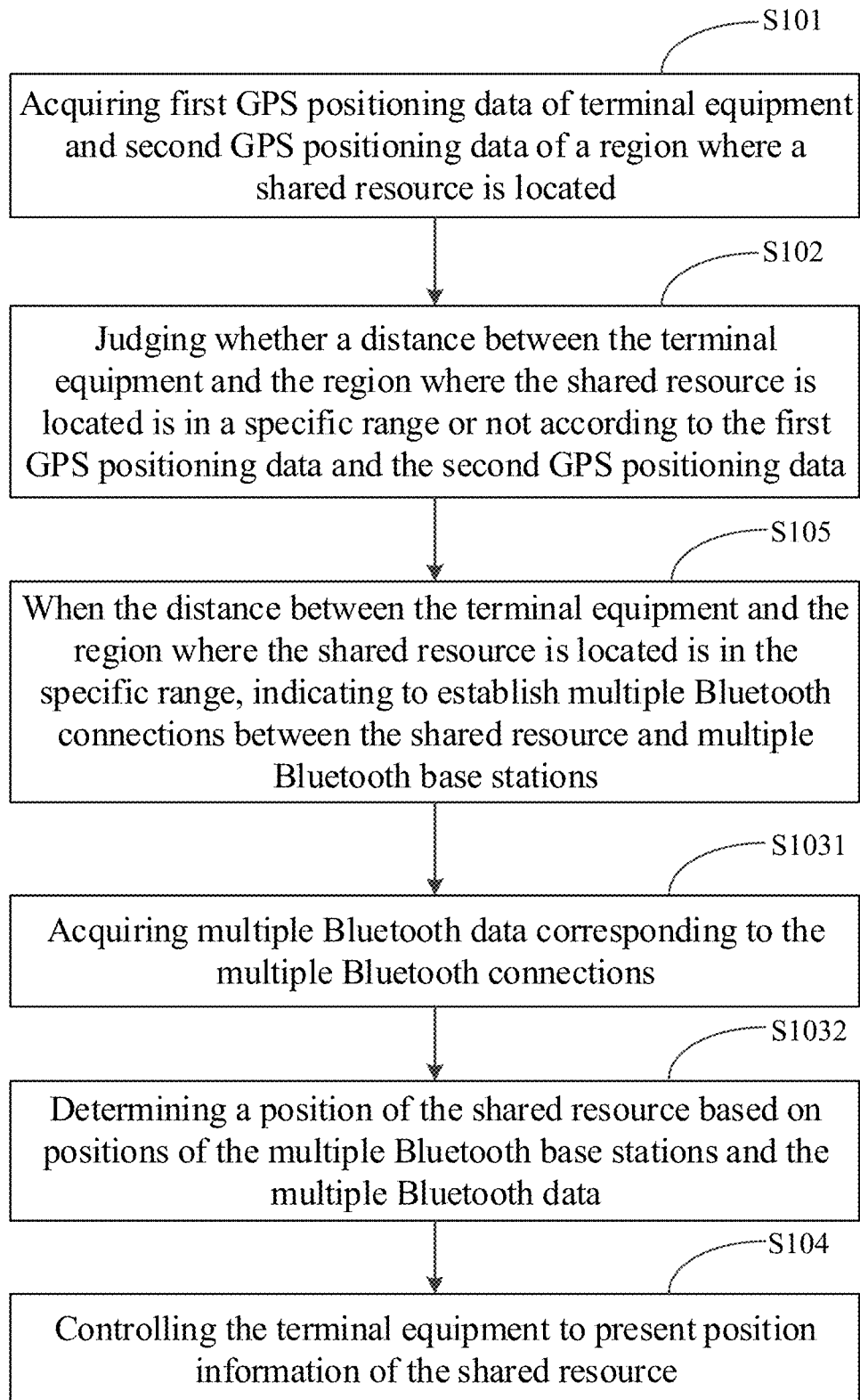
FIG. 2 is a flowchart showing a positioning method according to some embodiments.

FIG. 2 is a flowchart showing a positioning method according to some embodiments. In some implementations, the region may include multiple Bluetooth base stations. As shown in FIG. 2, the method may further include the following step.

In Step S105, when the distance between the terminal equipment and the region where the shared resource is located is in the specific range, the shared resource may be indicated to establish multiple Bluetooth connections with the multiple Bluetooth base stations.

For example, the region where the shared resource is located may include the multiple Bluetooth base stations. When the distance between the terminal equipment and the region where the shared resource is located is in the specific range, the server may indicate the shared resource (with a Bluetooth function) to establish the multiple Bluetooth connections with the multiple Bluetooth base stations. For example, the shared bicycle parking bay may include multiple Bluetooth base stations. When the distance between the mobile phone of the user and the shared bicycle parking bay is in the specific range, at this moment, the user has been located nearby the shared bicycle parking bay, and the server may indicate the shared bicycle (for example, the shared bicycle reserved by the user) to establish multiple Bluetooth connections with the multiple Bluetooth base stations. For example, the server may indicate the shared bicycle reserved by the user to establish Bluetooth connections with three Bluetooth base stations respectively.

In some implementations, when the distance between the terminal equipment and the region where the shared resource is located is in the specific range, the server may determine the position of the shared resource based on the Bluetooth data corresponding to the shared resource.

For example, when the distance between the terminal equipment and the region where the shared resource is located is in the specific range, the server may determine the position of the shared resource based on the Bluetooth data corresponding to the shared resource. For example, the user reserves a shared bicycle and walks to a position nearby the shared bicycle parking bay with the mobile phone according to a general position of the shared bicycle displayed on the map (at this moment, GPS positioning has lower accuracy, and the user may usually not rapidly find the shared bicycle the user wants), and the server may acquire Bluetooth data corresponding to the shared bicycle and determine a position of the shared bicycle according to the Bluetooth data. Therefore, the server may implement accurate positioning of the shared resource by combining two positioning manners of GPS positioning and Bluetooth positioning.

In some implementations, the region may include multiple Bluetooth base stations. As shown in FIG. 2, Step S103 may include the following steps.

In Step S1031, multiple Bluetooth data corresponding to the multiple Bluetooth connections may be acquired.

In Step S1032, the position of the shared resource may be determined according to positions of the multiple Bluetooth base stations and the multiple Bluetooth data.

For example, the server indicates the shared bicycle reserved by the user to establish Bluetooth connections with three Bluetooth base stations respectively. The server may acquire three pieces of Bluetooth data corresponding to the three Bluetooth connections. For example, the server may acquire Bluetooth data 1 corresponding to the Bluetooth connection between the shared bicycle reserved by the user and the Bluetooth base station 1, Bluetooth data 2 corresponding to the Bluetooth connection between the shared bicycle reserved by the user and the Bluetooth base station 2 and Bluetooth data 3 corresponding to the Bluetooth connection between the shared bicycle reserved by the user and the Bluetooth base station 3.

In some implementations, the server may determine the position of the shared resource according to positions of the multiple Bluetooth base stations and the multiple Bluetooth data.

For example, the Bluetooth data may be signal strength of the Bluetooth connections, and the server may determine the position of the shared resource according to the positions of the multiple Bluetooth base stations and the signal strength of the multiple Bluetooth connections between the shared resource and the multiple Bluetooth base stations. For example, the shared bicycle establishes the three Bluetooth connections with the three Bluetooth base stations of the shared bicycle parking bay respectively. The server may acquire the three pieces of Bluetooth data corresponding to the three Bluetooth connections, i.e., signal strength 1 of the Bluetooth connection between the shared bicycle and the Bluetooth base station 1, signal strength 2 of the Bluetooth connection between the shared bicycle and the Bluetooth base station 2 and signal strength 3 of the Bluetooth connection between the shared bicycle and the Bluetooth base station 3 respectively. The server may determine the position of the shared resource according to the positions of the three Bluetooth base stations and the three pieces of signal strength.

In some implementations, the server may calculate the position of the shared resource under assistance of a related algorithm according to the positions of the multiple Bluetooth base stations and the multiple Bluetooth data.

For example, the server may determine the position of the shared resource through a triangular positioning algorithm according to the positions of the multiple Bluetooth base stations and the multiple Bluetooth data. Each position of the region where the shared resource is located may establish Bluetooth connections with at least three Bluetooth base stations in the region where the shared resource is located. For example, the server may determine the position of the shared bicycle through the triangular positioning algorithm according to the positions of the three Bluetooth base stations and the three pieces of signal strength. Therefore, the position of the shared resource may be determined more accurately.

Those of ordinary skill in the art will recognize that the related technology may be adopted to implement determination of the position of the shared resource through the triangular positioning algorithm according to the positions of the multiple Bluetooth base stations and the multiple Bluetooth data. The server may further calculate the position of the shared resource through some auxiliary algorithms, for example, a weighted average algorithm, an inertial navigation algorithm and a gaussian filtering algorithm, in combination with the triangular positioning algorithm, which is not limited in the present disclosure.

In some implementations, the server may determine the position of the shared resource based on fingerprint data of the region where the shared resource is located according to the positions of the multiple Bluetooth base stations and the multiple Bluetooth data. The fingerprint data refers to pre-measured Bluetooth data corresponding to each position of the region where the shared resource is located.

For example, the Bluetooth data corresponding to each position of the region where the shared resource is located may be pre-measured, and the Bluetooth data is determined as the fingerprint data of the region where the shared resource is located. The server may determine the position of the shared resource based on the fingerprint data according to the positions of the multiple Bluetooth base stations and the multiple Bluetooth data.

For example, for a certain shared bicycle parking bay including multiple Bluetooth base stations, multiple Bluetooth data corresponding to multiple Bluetooth connections between a shared bicycle and the multiple Bluetooth base stations when the shared bicycle is parked at each position of the shared bicycle parking bay may be pre-measured, and the multiple Bluetooth data is determined as fingerprint data corresponding to the corresponding positions of the shared bicycle parking bay.

When the user reserves a certain shared bicycle in the shared bicycle parking bay, the server may acquire multiple Bluetooth data corresponding to multiple Bluetooth connections between the shared bicycle and the multiple Bluetooth base stations and corresponding positions of the multiple Bluetooth base stations.

The server may compare the positions of the multiple Bluetooth base stations and the multiple Bluetooth data with the pre-measured fingerprint data and determine the position of the shared resource according to correspondence. Therefore, the shared resource may be rapidly positioned according to the fingerprint data of the region where the shared resource is located. Those of ordinary skill in the art will recognize that the related technology may be adopted to implement determination of the fingerprint data and determination of the position of the shared resource according to the fingerprint data, which is not limited in the present disclosure.

In some implementations, the server may determine the position of the shared resource through a related algorithm in combination with the fingerprint data of the region where the shared resource is located according to the positions of the multiple Bluetooth base stations and the multiple Bluetooth data.

For example, the server may determine the position of the shared resource through the related algorithm in combination with the fingerprint data of the region where the shared resource is located.

For example, the server may determine the position of the shared resource through the fingerprint data according to the positions of the multiple Bluetooth base stations and the multiple Bluetooth data and modify or regulate the determined position of the shared resource through the triangular positioning algorithm.

Therefore, the position of the shared resource may be determined more accurately. Those of ordinary skill in the art will recognize that the related technology may be adopted to implement determination of the position of the shared resource by the server through the related algorithm in combination with the fingerprint data of the region where the shared resource is located according to the positions of the multiple Bluetooth base stations and the multiple Bluetooth data, which is not limited in the present disclosure.

In such a manner, the server rapidly and accurately determines the position of the shared resource by combining the two positioning manners of GPS positioning and Bluetooth positioning according to the Bluetooth data corresponding to the shared resource.

In addition, the server may further determine the distribution condition of the shared resources in the region where the shared resource is located according to Bluetooth data corresponding to the shared resources of the region where the shared resource is located.

As mentioned above, when the user expects to use the shared resource, the server may control the terminal equipment of the user to present the distribution condition, determined according to the Bluetooth data corresponding to the shared resources, of the shared resources nearby the user, thereby implementing positioning of a shared resource without any GPS positioning portion and reducing shared resource production cost. Those of ordinary skill in the art will recognize that multiple manners may be adopted to determine the position of the shared resource based on the Bluetooth data corresponding to the shared resource, which is not limited in the present disclosure.

In some implementations, the server may control the terminal equipment to present the position information of the shared resource.

For example, as mentioned above, the server determines the position of the shared resource based on the Bluetooth data corresponding to the shared resource, and the server may control the terminal equipment to present the position information of the shared resource.

For example, the user reserves a shared bicycle through the mobile phone, the server may determine a position of the shared bicycle based on Bluetooth data corresponding to the shared bicycle when the user goes to a position nearby a shared bicycle parking bay where the shared bicycle is parked, for example, the shared bicycle is located in middle of the shared bicycle parking bay, the server may control the mobile phone of the user to present the position information of the shared bicycle, for example, a map of the shared bicycle parking bay may be presented, and the shared bicycle reserved by the user is marked in middle of the map.

Figure 3:
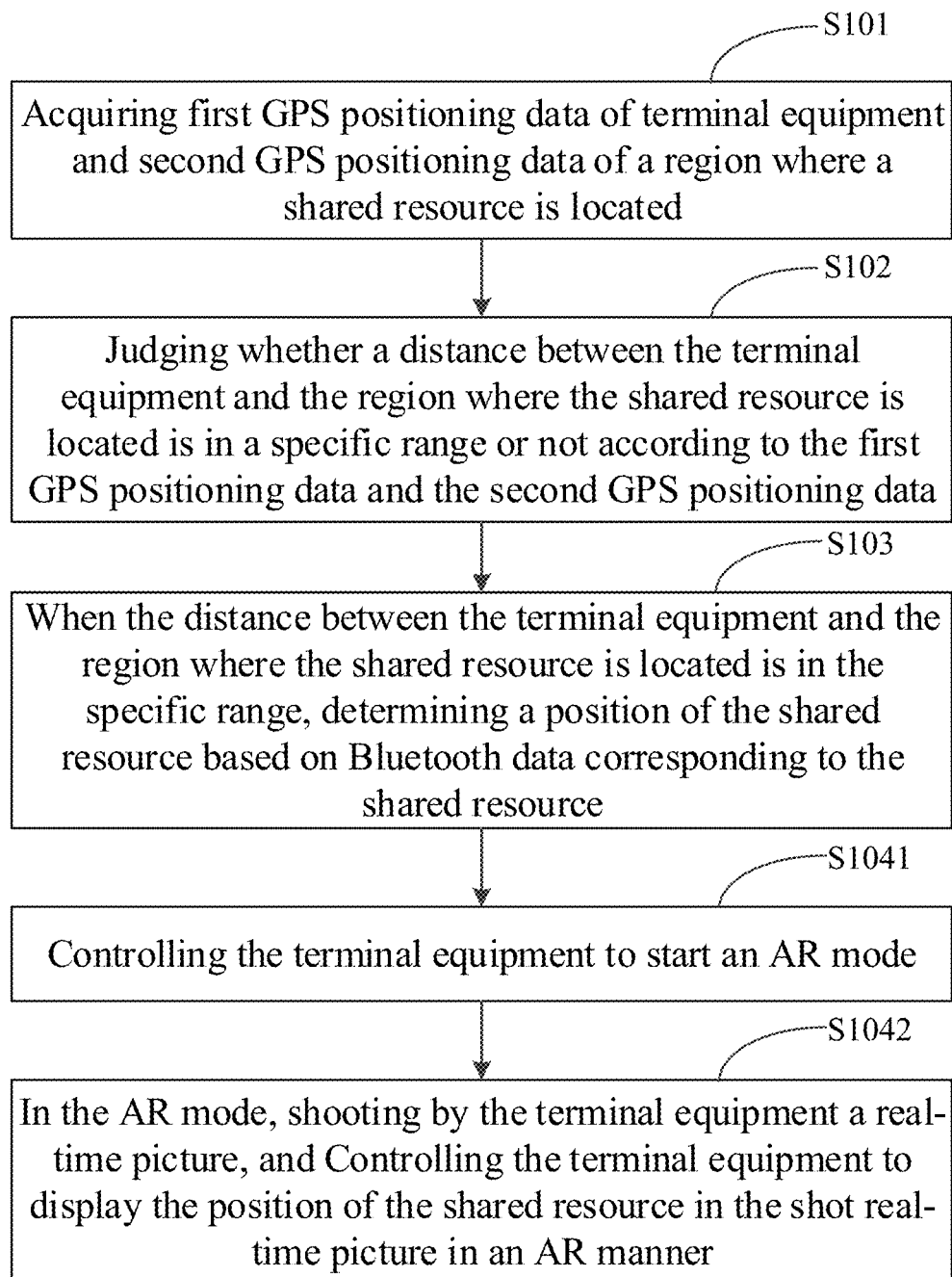
FIG. 3 is a flowchart showing a positioning method according to some embodiments.

FIG. 3 is a flowchart showing a positioning method according to some embodiments. In some implementations, as shown in FIG. 3, Step S104 may include the following steps.

In Step S1401, the terminal equipment may be controlled to start an AR mode.

In Step S1402, in the AR mode, the terminal equipment may shoot a real-time picture, and the terminal equipment may be controlled to display the position of the shared resource in the shot real-time picture in an AR manner.

For example, the server may control the terminal equipment to start the AR mode. For example, the server may switch the mobile phone of the user from a map mode to the AR mode and start a shooting device (for example, a camera) of the mobile phone of the user.

In the AR mode, the terminal equipment may shoot the real-time picture and the server may control the terminal equipment to display the determined position of the shared resource in the shot real-time picture in the AR manner.

For example, in the AR mode, the mobile phone of the user may shoot a real-time picture through the camera, and for example, may shoot a real-time picture in front of the camera. The server may display the determined position of the shared bicycle in the shot real-time picture in the AR manner. For example, the server may overlap a virtual image of the shared bicycle (for example, a cartoon shared bicycle) into the real-time picture shot by the mobile phone. The server may further overlap a virtual identifier such as a virtual arrow configured to prompt the position of the shared resource into the real-time picture shot by the mobile phone of the user. When the user turns the mobile phone, a direction of the virtual arrow may also change to prompt the position of the shared resource (for example, the virtual arrow always points to the determined position of the shared bicycle).

In such a manner, the position of the shared resource may be displayed more directly and the user may conveniently, rapidly and accurately find the shared resource. Those of ordinary skill in the art will recognize that the related technology may be adopted to implement control over the terminal equipment for starting the AR mode and control over the terminal equipment for displaying the position of the shared resource in the shot real-time picture in the AR manner.

In addition, the server may control the terminal equipment to display the position of the shared resource in the shot real-time picture in the AR manner in multiple manners as long as the terminal equipment is controlled to display the determined position of the shared resource in the shot real-time picture in the AR manner, which is not limited in the present disclosure.

Figure 4:
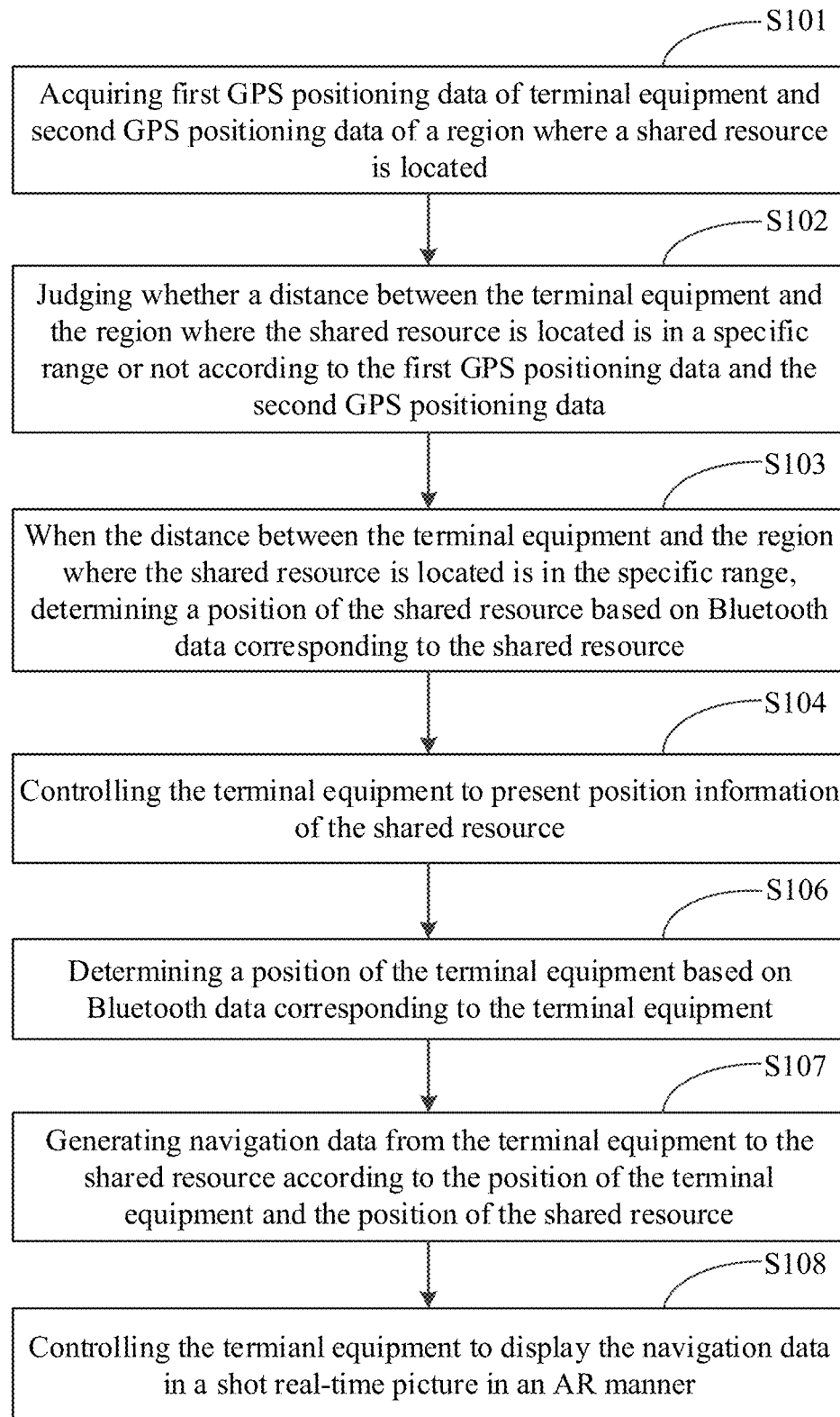
FIG. 4 is a flowchart showing a positioning method according to some embodiments.

FIG. 4 is a flowchart showing a positioning method according to some embodiments. In some implementations, the shared resource may be a shared resource reserved or selected by the terminal equipment. As shown in FIG. 4, the method may further include the following steps.

In Step S106, a position of the terminal equipment may be determined based on Bluetooth data corresponding to the terminal equipment.

In Step S107, navigation data from the terminal equipment to the shared resource i may be generated according to the position of the terminal equipment and the position of the shared resource.

In Step S108, the terminal equipment may be controlled to display the navigation data in the shot real-time picture in the AR manner.

For example, the server may further acquire the Bluetooth data corresponding to the terminal equipment and determine the position of the terminal equipment. For example, the terminal equipment may establish Bluetooth connections with the multiple Bluetooth base stations, and the server may acquire the Bluetooth data corresponding to the terminal equipment and determine the position of the terminal equipment. Those of ordinary skill in the art will recognize that the related technology may be adopted to implement acquisition of the Bluetooth data corresponding to the terminal by the server and determination of the position of the terminal equipment based on the Bluetooth data corresponding to the terminal equipment, for example, the triangular positioning algorithm as mentioned above, which is not limited in the present disclosure.

In some implementations, the server may generate the navigation data from the terminal equipment to the shared resource according to the position of the terminal equipment and the position of the shared resource and control the terminal equipment to display the navigation data in the shot real-time picture in the AR manner.

For example, the server may generate the navigation data from the terminal equipment to the shared resource according to the position of the terminal equipment and the position of the shared resource. For example, the server may generate navigation data from the user to the shared bicycle according to the position of the mobile phone of the user and the position of the shared bicycle.

The server may control the terminal equipment to display the navigation data in the shot real-time picture in the AR manner. For example, the server may overlap a virtual navigation image into the real-time picture shot by the mobile phone of the user or the like for the user to know about the navigation data more directly and rapidly find the shared resource according to the navigation data.

Those of ordinary skill in the art will recognize that the related technology may be adopted to implement generation of the navigation data from the terminal equipment to the shared resource by the server according to the position of the terminal equipment and the position of the shared resource and control over the terminal equipment for displaying the navigation data in the shot real-time picture in the AR manner.

In addition, the navigation data may also be displayed in the shot real-time picture in the AR manner in multiple manners, which is not limited in the present disclosure.

Figure 5:
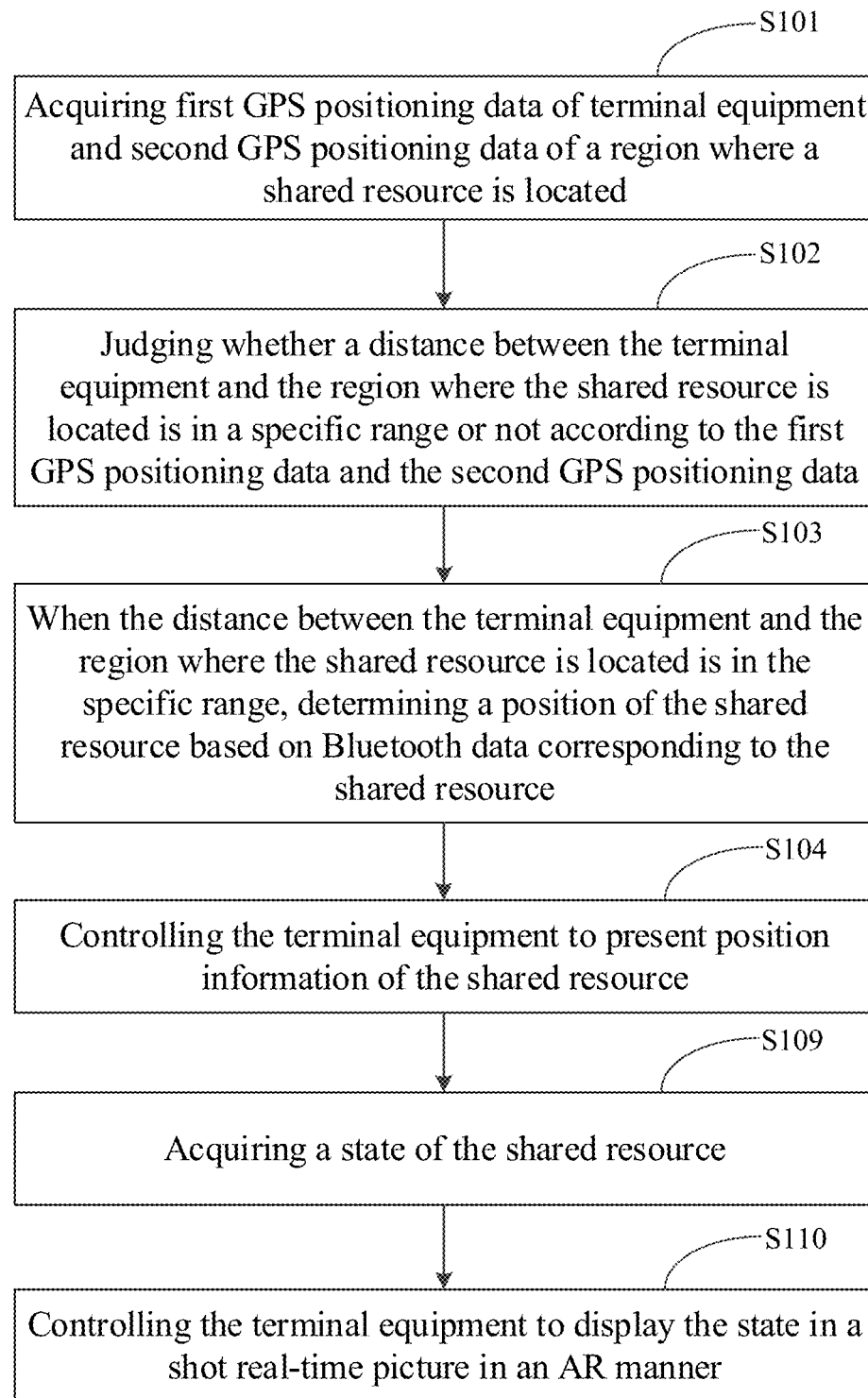
FIG. 5 is a flowchart showing a positioning method according to some embodiments.

FIG. 5 is a flowchart showing a positioning method according to some embodiments. In some implementations, as shown in FIG. 5, the method may further include the following steps.

In Step S109, a state of the shared resource may be acquired.

In Step S110, the terminal equipment may be controlled to display the state in the shot real-time picture in the AR manner.

For example, the server may acquire the state of the shared resource and control the terminal equipment to display the state in the shot real-time picture in the AR manner.

For example, a state of the shared bicycle may include normal, failure, reserved or the like. When the user arrives at the shared bicycle parking bay by the abovementioned method (for example, the user does not reserve any shared bicycle at this moment), the server may control the mobile phone of the user to display states of shared bicycles in a shooting range in a shot real-time picture in the AR manner.

For example, the mobile phone of the user shoots five shared bicycles, and the server may acquire states of the five shared bicycles, for example, the states of three indicate failure, the state of one is reserved and the state of one is normal. The server may control the mobile phone of the user to display the states of the five shared bicycles in the shot real-time picture in the AR manner.

For example, a virtual text representing the state is overlapped besides each of the shared bicycles in the shot real-time picture. Alternatively, virtual X marks are overlapped on the three shared bicycles of which the states indicate failure in the shot real-time picture, red is overlapped on the shared bicycle of which the state is normal and a virtual dynamic shared bicycle image is overlapped on the shared bicycle of which the state is normal.

In such a manner, the user may conveniently and timely know about the state of the shared resource, visibility of the state of the shared resource for the user is achieved, a probability of applying for a shared resource in an unavailable service state by the user is reduced, application efficiency is improved and time is saved for the user.

Those of ordinary skill in the art will recognize that the related technology may be adopted to implement acquisition of the state of the shared resource by the server. The state of the shared resource may include multiple forms, for example, available, unavailable and available for 1 hour, not limited to normal, failure and reserved. The server may adopt the related technology to implement control over the terminal equipment for displaying the state in the shot real-time picture in the AR manner and the terminal equipment may be controlled to display the state in the shot real-time picture in the AR manner in multiple manners which may be setting by a system as a default and may also be personalized setting by the user according to a using habit, which is not limited in the present disclosure.

In some implementations, the server may acquire the state of the shared resource and control the shared resource to display its state.

For example, as mentioned above, the server may acquire the state of the shared resource. For example, the server acquires the five shared bicycles nearby the user, in which the states of three are failure, the state of one is reserved and the state of one is normal. The server may control the shared resource to display its state.

For example, lamps configured to prompt the states may be mounted on bodies of the shared bicycles, colors of the lamps may represent the states and the server may control the colors of the lamps to display the states of the shared bicycles.

For example, the lamps of the three shared bicycles of which the states are failure may be red, the lamp of the shared resource of which the state is reserved may be yellow and the lamp of the shared resource of which the state is normal may be green. When the user clicks an identifier representing a shared bicycle on the screen of the mobile phone, the server may acquire the shared bicycle selected by the user and control the shared bicycle to display its state.

In such a manner, the user may conveniently and timely know about the state of the shared resource, visibility of the state of the shared resource for the user is achieved, the condition that the user applies for a shared resource in an unavailable service state is reduced, the application efficiency is improved and time is saved for the user.

Those of ordinary skill in the art will recognize that the related technology may be adopted to implement acquisition of the state of the shared resource by the server and control over the shared resource for displaying its state, which is not limited in the present disclosure.

An application example according to some embodiments of the present disclosure will be provided below for conveniently understanding the flow of the positioning method in combination with an exemplary application scenario in which a user uses a shared bicycle. Those of ordinary skill in the art will recognize that the following application example is merely intended to make the embodiments of the present disclosure conveniently understood and should not be considered as a limit to the embodiments of the present disclosure.

Figure 6:
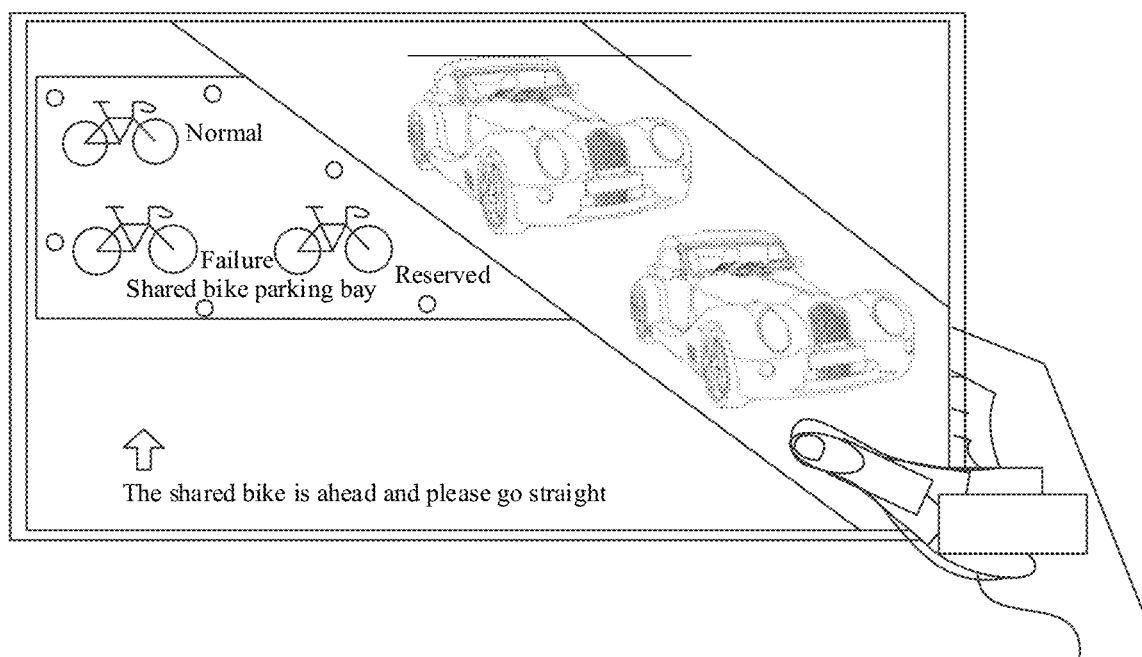
FIG. 6 is a schematic diagram illustrating an application scenario of a positioning method according to some embodiments.

FIG. 6 is a schematic diagram illustrating an application scenario of a positioning method according to some embodiments. As shown in FIG. 6, in the application example, a user expects to use a shared bicycle and starts certain bicycle sharing software, and the server acquires first GPS positioning data of the user and determines multiple shared bicycle parking bays nearby the user and a general distribution condition of multiple shared bicycles parked in the multiple shared bicycle parking bays according to the first GPS positioning data. The server controls a mobile phone of the user to present the multiple shared bicycle parking bays and the general distribution condition of the multiple shared bicycles parked in the multiple shared bicycle parking bays.

In the application example, the user selects to go to one shared bicycle parking bay. The server may acquire the first GPS positioning data of the mobile phone of the user and second GPS positioning data of the shared bicycle parking bay selected by the user. In the application example, the server may judge whether a distance between the mobile phone of the user and the shared bicycle parking bay selected by the user is in a specific range or not according to the first GPS positioning data of the mobile phone of the user and the second GPS positioning data of the shared bicycle parking bay selected by the user. In the application example, when the distance between the mobile phone of the user and the shared bicycle parking bay selected by the user is in the specific range, the server may indicate a shared bicycle in the shared bicycle parking bay to establish three Bluetooth connections with three Bluetooth base stations in the shared bicycle parking bay.

In the application example, the server may acquire three pieces of Bluetooth data corresponding to the three Bluetooth connections and determine a position of the shared bicycle in the shared bicycle parking bay according to positions of the three Bluetooth base stations and the three pieces of Bluetooth data.

In the application example, the server controls the mobile phone of the user to start an AR mode. In the AR mode, the server controls the mobile phone of the user to display the position of the shared bicycle in a real-time picture shot by the mobile phone of the user in an AR manner.

For example, the server overlaps a virtual arrow indicating the position of the shared bicycle into the real-time picture shot by the mobile phone of the user, and when the user turns the mobile phone, the virtual arrow also turns and always points to the position of the shared bicycle.

The server may further overlap a virtual text into the real-time picture shot by the mobile phone of the user. For example, when the position of the shared bicycle is in front of the mobile phone of the user, a virtual text "the shared bicycle is ahead and please go straight" may be overlapped into the real-time picture shot by the mobile phone of the user, and when the user turns the mobile phone and the position of the shared bicycle is deviated from the front of the mobile phone of the user, a virtual text "the shared bicycle is on the left and please move the mobile phone to the left" may be overlapped into the real-time picture shot by the mobile phone of the user.

In the application example, the server determines a position of the mobile phone of the user based on Bluetooth data corresponding to the mobile phone of the user. In the application example, the server generates navigation data from the mobile phone of the user to the shared bicycle according to the position of the mobile phone of the user and the position of the shared resource. The server controls the mobile phone of the user to display the navigation data in the real-time picture shot by the mobile phone of the user in the AR manner.

In the application example, the server acquires states of three shared bicycles in the shared bicycle parking bay. For example, the state of one is failure, the state of one is reserved and the state of one is normal. In the application example, the server controls the mobile phone of the user to display the states of the three shared bicycles in the shared bicycle parking bay in the real-time picture shot by the mobile phone of the user in the AR manner. For example, a virtual text representing the state is overlapped beside each of the shared bicycles in the shot real-time picture.

According to the embodiments of the present disclosure, when it is judged through the positioning data of the terminal equipment and the region where the shared resource is located that the distance between the terminal equipment and the region where the shared resource is located is in the specific range, the position of the shared resource is determined based on the Bluetooth data corresponding to the shared resource, and the terminal equipment is controlled to present the position information of the shared resource, so that accurate positioning of the shared resource is implemented, and a user may conveniently and rapidly find the shared resource.

Figure 7:
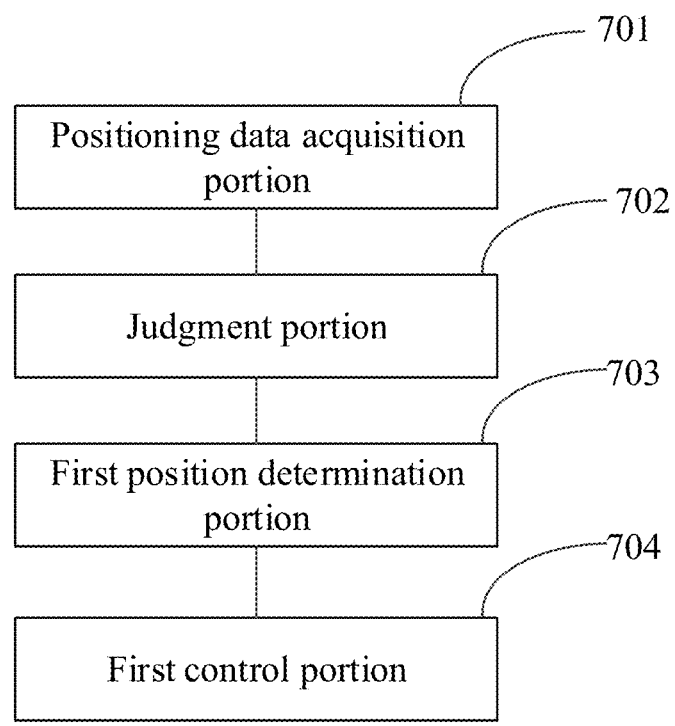
FIG. 7 is a block diagram of a positioning device according to some embodiments.

FIG. 7 is a block diagram of a positioning device according to some embodiments. Referring to FIG. 7, the device may include a positioning data acquisition portion 701, a judgment portion 702, a first position determination portion 703 and a first control portion 704.

The various device components, blocks, or portions may have modular configurations, or are composed of discrete components, but nonetheless may be referred to as "modules" in general. In other words, the "modules" referred to herein may or may not be in modular forms.

The positioning data acquisition portion 701 may be configured to acquire first GPS positioning data of terminal equipment and second GPS positioning data of a region where a shared resource is located.

The judgment portion 702 may be configured to judge whether a distance between the terminal equipment and the region where the shared resource is located is in a specific range or not according to the first GPS positioning data and the second GPS positioning data.

The first position determination portion 703 may be configured to, when the distance between the terminal equipment and the region where the shared resource is located is in the specific range, determine a position of the shared resource based on Bluetooth data corresponding to the shared resource.

The first control portion 704 may be configured to control the terminal equipment to present position information of the shared resource.

Figure 8:
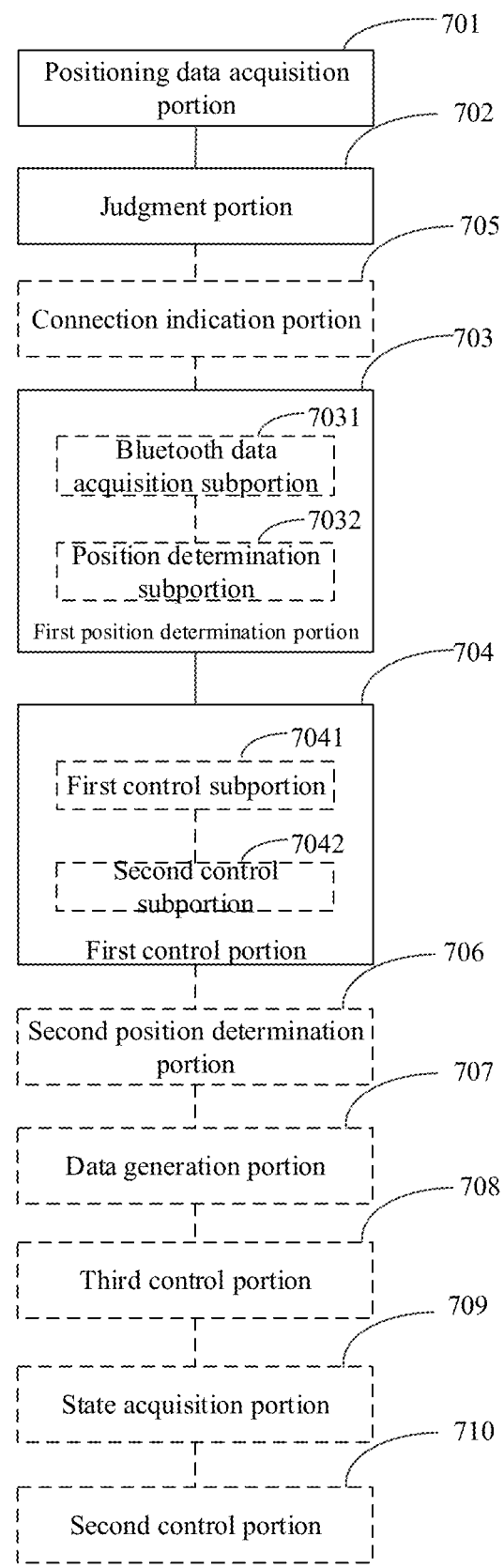
FIG. 8 is a block diagram of a positioning device according to some embodiments.

FIG. 8 is a block diagram of a positioning device according to some embodiments. Referring to FIG. 8, in some implementations, the region may include multiple Bluetooth base stations, and the device may further include:

a connection indication portion 705, configured to, when the distance between the terminal equipment and the region where the shared resource is located is in the specific range, indicate the shared resource to establish multiple Bluetooth connections with the multiple Bluetooth base stations.

The first position determination portion 703 may include:

a Bluetooth data acquisition sub-portion 7031, configured to acquire multiple Bluetooth data corresponding to the multiple Bluetooth connections; and a position determination sub-portion 7032, configured to determine the position of the shared resource according to positions of the multiple Bluetooth base stations and the multiple Bluetooth data.

Referring to FIG. 8, in some implementations, the first control portion 704 may include:

a first control sub-portion 7041, configured to control the terminal equipment to start an AR mode; and a second control sub-portion 7042, configured to control the terminal equipment to display the position of the shared resource in the shot real-time picture in an AR manner when the terminal equipment shoots a real-time picture in the AR mode.

Referring to FIG. 8, in some implementations, the device may further include:

a state acquisition portion 709, configured to acquire a state of the shared resource; and a second control portion 710, configured to control the terminal equipment to display the state in the shot real-time picture in the AR manner.

Referring to FIG. 8, in some implementations, the shared resource may be a shared resource reserved or selected by the terminal equipment, and the device may further include:

a second position determination portion 706, configured to determine a position of the terminal equipment based on Bluetooth data corresponding to the terminal equipment;

a data generation portion 707, configured to generate navigation data from the terminal equipment to the shared resource according to the position of the terminal equipment and the position of the shared resource; and a third control portion 708, configured to control the terminal equipment to display the navigation data in the shot real-time picture in the AR manner.

With respect to the device in the above embodiment, the specific manners for performing operations for individual portions therein have been described in detail in the embodiments regarding the methods, which will not be elaborated herein.

Figure 9:
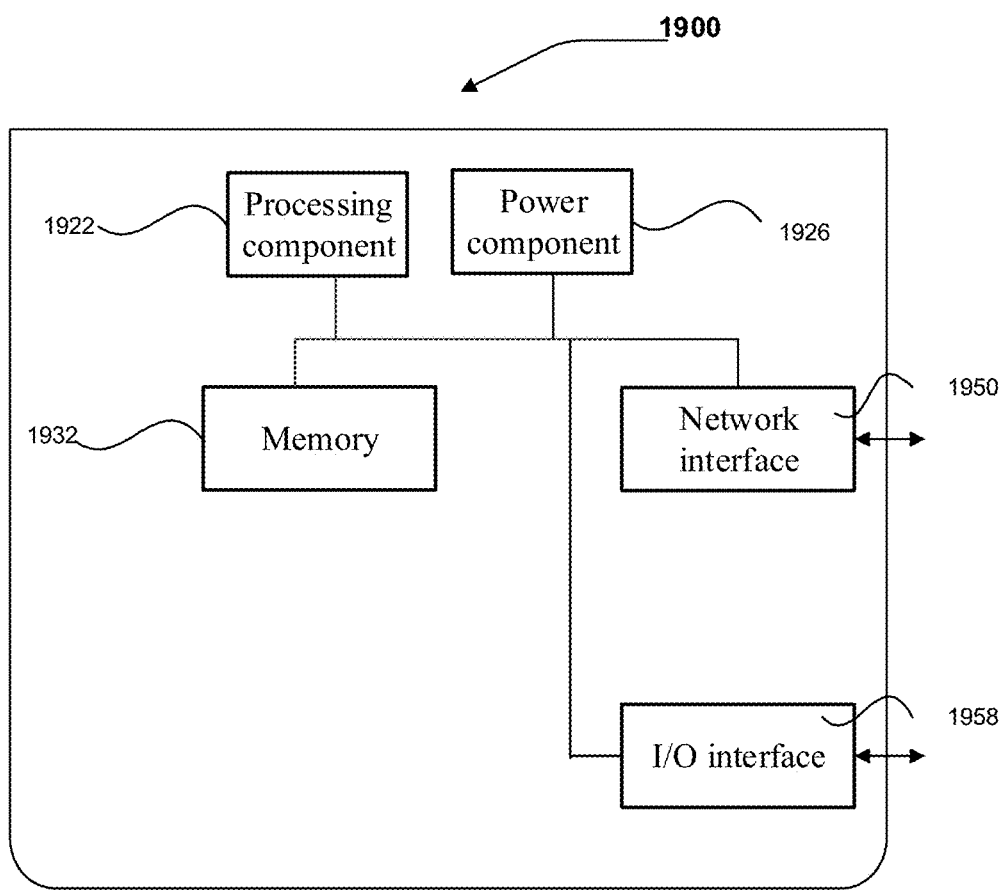
FIG. 9 is a block diagram of a positioning device according to some embodiments.

FIG. 9 is a block diagram of a positioning device according to some embodiments. For example, the device 1900 may be provided as a server. Referring to FIG. 9, the device 1900 may include a positioning component 1922, which may further include one or more processors, and a memory resource represented by a memory 1932, which is configured to store instructions executable for the processing component 1922, for example, application programs (e.g., APPs or Applications). The application programs stored in the memory 1932 may include one or more than one portion of which each corresponds to a set of instructions. In addition, the processing component 1922 may be configured to execute the instructions to execute the above method.

The device 1900 may further include a power component 1926 configured to execute power management of the device 1900, a wired or wireless network interface 1950 configured to connect the device 1900 to a network, and an Input/Output (I/O) interface 1958. The device 1900 may be operated based on an operating system stored in the memory 1932, for example, Windows Server™, Mac OS X™, Unix™, Linux™ or FreeBSD™.

In some embodiments, there is further provided a non-transitory computer-readable storage medium including instructions, for example, the memory 1932 including the instructions, and the instructions may be executed by the processing component 1922 of the device 1900 to implement the above method. For example, the non-transitory computer-readable storage medium may be a Read-Only Memory (ROM), a Random-Access Memory (RAM), a Compact Disc-ROM (CD-ROM), a magnetic tape, a floppy disk, optical data storage equipment or the like.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a standalone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A positioning method, executed by a server, comprising:
    acquiring, by the server, first positioning data of terminal equipment and second positioning data of a region where a shared resource is located, wherein the region comprises multiple Bluetooth base stations, and the shared resource is a shared bicycle or a shared car;
    judging, by the server, whether a distance between the terminal equipment and the region where the shared resource is located is in a specific range or not according to the first positioning data and the second positioning data;
    upon the distance between the terminal equipment and the region where the shared resource is located is in the specific range:
        indicating, by the server, the shared resource to establish multiple Bluetooth connections with the multiple Bluetooth base stations;
        acquiring, by the server, multiple Bluetooth data corresponding to the multiple Bluetooth connections;
        determining, by the server, a position of the shared resource based on fingerprint data of the region where the shared resource is located according to positions of the multiple Bluetooth base stations and the multiple Bluetooth data, wherein the fingerprint data comprises pre-measured Bluetooth data corresponding to each position of the region where the shared resource is located; and
    controlling, by the server, the terminal equipment to present position information of the shared resource.

2. The positioning method of claim 1, wherein the first and second positioning data are satellite-based positioning data.

3. The positioning method of claim 2, wherein the satellite-based positioning comprises Global Positioning System (GPS) based positioning.

4. The method of claim 1, wherein the controlling the terminal equipment to present the position information of the shared resource comprises:
    controlling the terminal equipment to start an Augmented Reality (AR) mode; and
    in the AR mode, obtaining, by the terminal equipment, a real-time picture, and controlling the terminal equipment to display the position of the shared resource in the obtained real-time picture in the AR mode.

5. The method of claim 1, further comprising:
    acquiring a state of the shared resource; and
    controlling the terminal equipment to display the state in an obtained real-time picture in an Augmented Reality (AR) mode when the terminal equipment obtains the real-time picture in the AR mode.

6. The method of claim 1, wherein the shared resource is a shared resource reserved or selected by the terminal equipment, and the method further comprises:
    determining a position of the terminal equipment based on Bluetooth data corresponding to the terminal equipment;
    generating navigation data from the terminal equipment to the shared resource according to the position of the terminal equipment and the position of the shared resource; and
    controlling the terminal equipment to display the navigation data in an obtained real-time picture in an Augmented Reality (AR) mode when the terminal equipment obtains the real-time picture in the AR mode.

7. A positioning device, for use in a server, comprising:
a processing circuit; and
memory configured to store instructions executable by the processing circuit,
wherein the processing circuit is configured to:
acquire first positioning data of terminal equipment and second positioning data of a region where a shared resource is located, wherein the region comprises multiple Bluetooth base stations, and the shared resource is a shared bicycle or a shared car;
judge whether a distance between the terminal equipment and the region where the shared resource is located is in a specific range or not according to the first positioning data and the second positioning data;
in a case that the distance between the terminal equipment and the region where the shared resource is located is in the specific range:
indicate the shared resource to establish multiple Bluetooth connections with the multiple Bluetooth base stations;
acquire multiple Bluetooth data corresponding to the multiple Bluetooth connections;
determine a position of the shared resource based on fingerprint data of the region where the shared resource is located according to positions of the multiple Bluetooth base stations and the multiple Bluetooth data wherein the fingerprint data comprises pre-measured Bluetooth data corresponding to each position of the region where the shared resource is located; and
control the terminal equipment to present position information of the shared resource.

8. The device of claim 7, wherein the first and second positioning data are satellite-based positioning data.

9. The device of claim 8, wherein the satellite-based positioning comprises Global Positioning System (GPS) based positioning.

10. The device of claim 7, wherein the processing circuit is further configured to:
control the terminal equipment to start an Augmented Reality (AR) mode; and
control the terminal equipment to display the position of the shared resource in an obtained real-time picture in the AR mode when the terminal equipment obtains the real-time picture in the AR mode.

11. The device of claim 7, wherein the processing circuit is further configured to:
acquire a state of the shared resource; and
control the terminal equipment to display the state in an obtained real-time picture in an Augmented Reality (AR) mode when the terminal equipment obtains the real-time picture in the AR mode.

12. The device of claim 7, wherein the shared resource is a shared resource reserved or selected by the terminal equipment, and the processing circuit is further configured to:
determine a position of the terminal equipment based on Bluetooth data corresponding to the terminal equipment;
generate navigation data from the terminal equipment to the shared resource according to the position of the terminal equipment and the position of the shared resource; and
control the terminal equipment to display the navigation data in an obtained real-time picture in an Augmented Reality (AR) mode when the terminal equipment obtains the real-time picture in the AR mode.

13. A non-transitory computer-readable storage medium, having stored therein instructions which, when executed by a processor comprised in a server, enable the processor to execute a positioning method, the method comprising:
acquiring, by the server, first positioning data of terminal equipment and second positioning data of a region where a shared resource is located, wherein the region comprises multiple Bluetooth base stations, and the shared resource is a shared bicycle or a shared car;
judging, by the server, whether a distance between the terminal equipment and the region where the shared resource is located is in a specific range or not according to the first positioning data and the second positioning data;
if the distance between the terminal equipment and the region where the shared resource is located is in the specific range:
indicating, by the server, the shared resource to establish multiple Bluetooth connections with the multiple Bluetooth base stations;
acquiring, by the server, multiple Bluetooth data corresponding to the multiple Bluetooth connections;
determining, by the server, a position of the shared resource based on fingerprint data of the region where the shared resource is located according to positions of the multiple Bluetooth base stations and the multiple Bluetooth data wherein the fingerprint data comprises pre-measured Bluetooth data corresponding to each position of the region where the shared resource is located; and
controlling, by the server, the terminal equipment to present position information of the shared resource.

14. The non-transitory computer-readable storage medium of claim 13, wherein the first and second positioning data are satellite-based positioning data.

15. The non-transitory computer-readable storage medium of claim 14, wherein the satellite-based positioning comprises Global Positioning System (GPS) based positioning.

16. The non-transitory computer-readable storage medium according to claim 13, wherein controlling the terminal equipment to present the position information of the shared resource comprises:
controlling the terminal equipment to start an Augmented Reality (AR) mode; and
in the AR mode, obtaining, by the terminal equipment, a real-time picture, and controlling the terminal equipment to display the position of the shared resource in the obtained real-time picture in the AR mode.

17. The non-transitory computer-readable storage medium according to claim 13, wherein the method further comprises:
acquiring a state of the shared resource; and
controlling the terminal equipment to display the state in an obtained real-time picture in an Augmented Reality (AR) mode when the terminal equipment obtains the real-time picture in the AR mode;
wherein the shared resource is a shared resource reserved or selected by the terminal equipment, and the method further comprises:
determining a position of the terminal equipment based on Bluetooth data corresponding to the terminal equipment;
generating navigation data from the terminal equipment to the shared resource according to the position of the terminal equipment and the position of the shared resource; and controlling the terminal equipment to display the navigation data in an obtained real-time picture in the AR mode when the terminal equipment obtains the real-time picture in the AR mode.

* * * * *